United States Patent Office 3,244,647
Patented Apr. 5, 1966

3,244,647
PREPARATION OF POLYPHOSPHONAMIDES
Robert Z. Greenley, St. Louis, Mo., and Morris L. Nielsen, Dayton, Ohio, assignors to Monsanto Research Corporation, St. Louis, Mo., a corporation of Delaware
No Drawing. Filed Feb. 26, 1965, Ser. No. 435,703
12 Claims. (Cl. 260—2)

This application is a continuation-in-part of our application Serial No. 163,056, filed December 21, 1961, and now abandoned, and of our application Serial No. 294,182, filed July 10, 1963, now abandoned.

The present invention relates to organic phosphorus polymers and more particularly provides a new and valuable method for the preparation of polyphosphonamides.

In prior art [see, e.g., Harris et al., J. Polymer Science, 35, 540 (1959)], some polyphosphonamides were prepared by reaction of an arylphosphonic dichloride with a diamine such as 1,6-diaminohexane or bis-aniline. Since the latter procedure involves the formation of by-product hydrogen chloride, the reaction is complicated by the production of the diamine hydrochlorides. This not only reduces the yield of polyphosphonamide, but also the unwanted hydrochlorides are difficultly removed from the reaction mixture. For that reason, a two-phase solvent system is generally required by the prior method in order to avoid aqueous hydrolysis of the dichloride reactant.

Now we have found that polyphosphonamides are readily prepared without encounter of the aforesaid difficulties by reaction of a diimidazol-1-ylhydrocarbonphosphine oxide in which the hydrocarbon radical is benzenoid, contains from 6 to 12 carbon atoms and is free of olefinic and acetylenic unsaturation, with a nitrogenous compound selected from the class consisting of (I) a diamine of the formula $$HN-Z-NH$$
$$\phantom{HN-}|\phantom{Z-}|$$
$$\phantom{HN-Z}Y\phantom{-}Y'$$

wherein Y and Y' are selected from the class consisting of hydrogen and hydrocarbyl radicals which are free of olefinic and acetylenic unsaturation and contain from 1 to 12 carbon atoms and Z is selected from the class consisting of hydrocarbylene radicals of from 3 to 15 carbon atoms and hydrocarbyleneoxyhydrocarbylene radicals of from 4 to 20 carbon atoms which are free of olefinic and acetylenic unsaturation and have the two nitrogen atoms attached to diverse, non-adjacent carbon atoms and (II) cyclic dialkylenediimines having from 1 to 3 carbon atoms in each alkylene chain and a total of from 4 to 12 carbon atoms in both alkylene radicals. The reaction occurs substantially as follows:

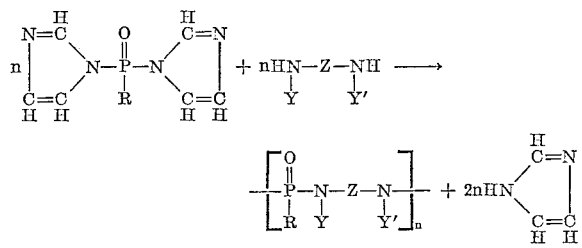

wherein R is a benzenoid hydrocarbon radical which is free of olefinic and acetylenic unsaturation and contains from 6 to 12 carbon atoms, Z, Y and Y' are as above defined, and n is an integer of up to 100.

The diimidazol-1-ylphosphine oxide is obtained by reaction of an aromatic hydrocarbylphosphonic dihalide with imidazole as described in our copending application Serial No. 294,179, filed July 10, 1963.

With a cyclic dialkylenediimine, the reaction takes place in the same manner; thus

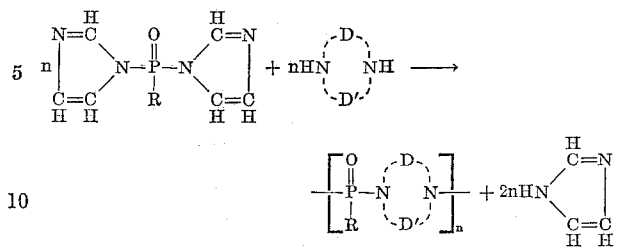

wherein R is as above defined and D and D' are alkylene radicals having from 1 to 3 carbon atoms in the chain and a total of from 4 to 12 carbon atoms in both alkylene radicals, and n is an integer of up to 100.

Examples of presently useful diimidazol-1-ylhydrocarbonphosphine oxides include those in which the hydrocarbon radical contains an aromatic nucleus and is free of olefinic and acetylenic unsaturation, e.g., diimidazol-1-ylphenylphosphine oxide, diimidazol-1-yl-α- or β-naphthylphosphine oxide, diimidazol-1-ylbiphenylylphosphine oxide, diimidazol-1-ylbenzylphosphine oxide, diimidazol-1-yl-2-, 3- or 4-tolyphosphine oxide, diimidazol-1-yl(2-, 3- or 4-hexylphenyl)phosphine oxide, diimidazol-1-yl-(3-phenylpropyl)phosphine oxide, diimidazol-1-yl-(pentamethylphenyl)phosphine oxide, diimidazol-1-yl-(2-, 3- or 4-cyclohexylphenyl)phosphine oxide.

The diamine reactant may be a primary or secondary amine.

The hydrocarbon diamine which is reacted with the diimidazol-1-ylhydrocarbonphosphine oxide to give polyphosphonamides according to the invention may be aliphatic, cycloaliphatic, aromatic, aliphatic-aromatic, cycloaliphatic-aromatic or cycloaliphatic-aliphatic, and the amino radicals may be attached to the straight-chain carbon or to the nuclear carbon.

Examples of the presently useful aliphatic hydrocarbon-diamines are alkylenediamines such as 1,3-propanediamine, 1,3- or 1,4-butanediamine, 1,3-dimethyl-1,3-butanediamine, 2-methyl-1,3-propanediamine, N,N'-dimethyl - 1,5 - pentanediamine, 2,2,4 - trimethyl - 1,5-pentanediamine, 2,4-dimethyl-2,4-pentanediamine, 1,6-hexanediamine, 2,5-diethyl-1,6-hexanediamine, 3,4-dimethyl-1,6-hexanediamine, 2- or 3-methyl-1,6-hexanediamine, 2,5-dimethyl-2,5-hexanediamine, 1,7-heptanediamine, 1,15-pentadecanediamine, 1,8-octanediamine, 3,7-dimethyl-1,7-octanediamine, 2-ethyl-1,8-octanediamine, 3,10-dodecanediamine, 1,12-dodecanediamine, 5,10-tetradecanediamine, etc. The alkylene radical carrying the amino groups may be substituted by a cycloalkyl or aryl group, e.g., 3-phenyl-1,5-pentanediamine or 4-cyclohexyl-1,6-hexanediamine.

Hydrocarbon diamines containing the aromatic nucleus which react with the diimidazol-1-ylhydrocarbonphosphine oxides to give polyphosphonamides may be arylenediamines, e.g., m- or p-phenylenediamine, N,N'-dimethyl-p-phenylenediamine, benzidine, 2,2'-, 3,3'- or 4,3'- diaminobiphenyl, 2,7-fluorenediamine, 5,6- acenaphthenediamine, 1,4-, 1,5- or 1,8-naphthalenediamine. The polyphosphonamides thus obtained contain the repeating unit

wherein R, Y and Y' are as defined above. The arylene group may or may not contain aliphatic or cycloaliphatic substituents, e.g., the diamine may be toluene-2,4- or 2,5- or 2,6- or 3,5-diamine, 2,4,6-triethyl-m-phenylenediamine, 3,5-dimethyl-p-phenylenediamine, 2,5-di-tertbutyl-p-phenylenediamine, diaminodurene, 2,2'-diethylbenzidine, 3-hexyl-p-phenylenediamine, 3-cyclopropyl-p-phenylenediamine, 4-cyclohexyl-m-phenylenediamine, N,N'-diethyl-3-cyclopentyl-p-phenylenediamine, etc.

As shown above, the diamine may contain primary amino groups wherein two hydrogen atoms are attached to each amino nitrogen, or it may contain secondary amino groups wherein one hydrogen atom is attached to each amino nitrogen or it may contain both primary and secondary amino groups. Examples of useful arylenediamines having both primary and secondary amino groups are N-ethyl-p-phenylenediamine, 4-aminodiphenylamine, N-phenylbenzidine, or N-isopropyl-1,8-naphthalenediamine.

The hydrocarbon diamine may likewise be a cycloalkylene diamine, e.g., o-, m- or p-cyclohexanediamine, or 1,3- or 3,5-cyclopentanediamine or 4,4'-diaminobicyclohexyl, and the nuclear carbon of the cycloalkane ring may have attached thereto alkyl and/or aryl substituents, e.g., 5-methylcyclopentane-1,3-diamine or 4-(4-aminophenyl)cyclohexylamine.

The arylene or cycloalkylene radicals at which the amino groups are nuclearly substituted may be attached to carbon atoms of an aliphatic group, e.g., the diamines may be arylenealkylenearylene or cycloalkylenealkylenecycloalkylene or arylenealkylenecycloalkylene diamines. Particularly valuable are the alkylenebisanilines, i.e., compounds of the formula

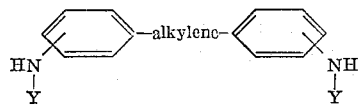

wherein the alkylene radical has from 1 to 3 carbon atoms, e.g., 4,4'-, 2,2'-, 3,3'- or 3,4'-methylenedianiline, 4,4'-ethylene-N,N'-dimethyldianiline, 4,4'-isopropylidenedianiline, etc.

Other useful hydrocarbon diamines having an alkylene radical interposed between nuclearly aminated rings are 4,4'-methylenebiscyclohexylamine, 3,3'-methylenebiscyclopentylamine, or 4-[(4-aminophenyl)methyl]cyclohexylamine.

The hydrocarbyl radicals to which amino groups are attached may be connected by an oxygen atom, e.g., the diamines may be alkyleneoxyalkylene, aryleneoxyarylene, cycloalkyleneoxycycloalkylene, alkyleneoxyarylene, alkyleneoxycycloalkylene, or aryleneoxycycloalkylene. Particularly valuable are the oxybisalkylamines, i.e. compounds of the formula

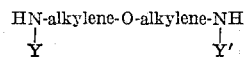

wherein Y and Y' are hydrogen or hydrocarbyl and wherein the alkylene radical has from 2 to 6 carbon atoms, e.g., 3,3'-oxybis(propylamine), 4,4'-oxybis(1-methylbutylamine), and 3,3' - oxybis(N-ethylpropylamine); and the axybis(arylenediamines), i.e., compounds of the formula

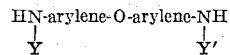

wherein Y and Y' are as defined above and wherein the arylene radical has from 6 to 15 carbon atoms and may or may not contain aliphatic or cycloaliphatic substituents, e.g., 3,3'-oxydianiline, 4,4'-oxydianiline, 4,4'-oxybis(2-methylaniline), and 4,4'-oxybis(N-isopropylaniline).

The useful cyclic dialkylenediimines include piperazine, and its C-alkyl derivatives such as 1,4- or 1,5-dimethylpiperazine or diethylpiperazine, 2-methylpiperazine, 2,3,5-trimethylpiperazine, hexahydropyrimidine, tetrahydro-1,4-diazepine, octahydro-1,5-diazocine, etc.

Reaction of the diamine or diimine with the diimidazol-1-ylhydrocarbonphosphine oxide takes place, as shown in the above equations, with formation of the desired polyphosphonamide and the production of imidazole as by-product. The by-product imidazole formed in preparation of the polyphosphonamide according to this invention can be used for making a new supply of diimidazol-1-ylhydrocarbonphosphine oxide for the polymerization reaction.

Preparation of polyphosphonamides by the presently provided process takes place by simply heating the phosphine oxide with the diamine or the diimine at temperatures of from, say, 50° C. to 250° C., at ordinary, decreased or increased pressure and in the presence or absence of a liquid diluent or solvent. The reaction takes place readily in the absence of a catalyst; however, a catalyst, preferably basic, may be employed. The nature of solvent or diluent will depend upon the specific reactants which are used as well as upon the temperature and pressure conditions. Virtually any organic liquid which is inert under the reaction conditions may be used as diluent; and as will be obvious to those skilled in the art, a low-boiling diluent generally will not be employed when the process is conducted at high temperatures or under substantially decreased pressure. Examples of useful diluents are dioxane, tetrahydrofuran, benzene, xylene, nitrobenzene, dimethylsulfoxide, dimethylformamide, etc. The use of a solvent will depend to some extent upon the nature of the reactants as well as upon the extent of heating. When one or both reactants are solids at moderately increased temperatures, a diluent will be generally useful; on the other hand, when the diamine or diimine is a liquid or melts readily at the contemplated reaction temperature, a diluent need not be used unless the diamine or diimine is extremely reactive. In that case, the use of an inert diluent will serve to moderate the reaction. As stated above, the temperature at which reaction is effected is variable; for here again must be taken into consideration the nature of the reactants, whether or not a catalyst and/or diluent is used and the pressure at which the reaction is conducted. Some of the present polymerizations can be conducted by gently warming, say, at temperatures of from 50° C. to 100° C. at ordinary atmospheric pressure. In other instances, heating of the reaction mixture at higher temperatures, say, at temperatures of from 100° C. to 250° C., and preferably at from 150° C. to 230° C. will be found to give optimum conversion. Operating in an inert atmosphere, e.g., nitrogen or argon, may be desirable, but not necessary. All of these variables, i.e., use of and nature of diluent, inert atmosphere, catalyst, temperature and pressure, can readily be arrived at by easy experimentation. Since reaction is evidenced by a change in viscosity, the extent of such change will be indicative of reaction. Very rapid reaction, as evidenced by rapid viscosity change will show the need for a diluent and/or lower temperature and/or shorter heating and/or no catalyst if one has been employed. Conversely, no reaction or only a very slow reaction will indicate the use of more extreme conditions. Thus, arrival at optimum reaction conditions is simply a matter of routine procedure by one skilled in the art. To assure complete reaction in experimental runs, it is generally recommended that the temperature of the reaction mixture be increased after the primary reaction has subsided. Completion of the reaction can then be ascertained by simply noting cessation in change of viscosity.

When the polymerization has been effected in the absence of a solvent or diluent and the reactants are employed in the stoichiometric proportions, generally the polymer is recovered from the reaction mixture by precipitating it from a non-solvent, whereby the by-product imidazole remains in solution. When the reaction is effected in the presence of a diluent which is a non-solvent for the polymer, the precipitated polymer is simply filtered off, washed and dried. When the reaction is conducted in a liquid which is a solvent for the polymer, the latter is separated from the reaction mixture by mixing with a liquid which is a non-solvent for the polymer. The by-product imidazole is generally much more soluble than the polymeric phosphonamide; this fact permits easy removal of the imidazole by washing.

To recapitulate: In the preparation of the polyphosphonamides, the phosphine oxide is reacted with a diamine or cyclic diimine or with a mixture of the same in the presence or absence of an inert diluent or solvent and in the presence or absence of a catalyst at a temperature which may be as low as, say, 50° C. and as high as, say, 250° C., at ordinary increased or decreased pressure. The phosphine oxide and the diamine or the diimine or mixtures thereof are employed in substantially stoichiometric proportions. There may be used a mixture of two or more diamines, for example, a mixture of benzidine and ethylenediamine. Likewise, there may be used a mixture of diimines or a mixture consisting of any proportion of one or more diimines and any proportion of one or more diamines to obtain polymers having various linkages dispersed more or less randomly in the polymer chain.

The presently prepared linear polymers range from waxy to high-melting solids. Of particular importance, however, are those of the presently prepared linear polymers which are solid resinous materials. Such products are readily compression molded with heating to give molded objects which are tough, transparent and of good dimensional stability. The polymers may also be cast into films from solutions thereof or fibers may be prepared therefrom by extruding through a suitable orifice into a precipitating bath. Solutions of the solid polymers or the viscous polymers which are obtainable under some conditions by incomplete polymerization are useful as impregnating agents and adhesives in the manufacture of laminates, resin base coatings, i.e., paints, varnishes, lacquers and enamels.

The invention is further illustrated by, but not limited to, the following examples.

*Example 1*

A mixture consisting of 16.1 g. (0.0625 mole) of diimidazol-1-ylphenylphosphine oxide and 7.3 g. (0.0625 mole) of 1,6-hexanediamine was heated at 140° C. under nitrogen for 3 hours. The reaction mixture was treated with methanol to dissolve all methanol-soluble material and the resulting mixture, containing only a small amount of insolubles, was decolorized with charcoal. The methanol solution was then added to a large excess of water, allowed to stratify and the liquid decanted from the solids. Addition of chloroform to the liquid gave 1.5 g. of the substantially pure polymeric product, M.P. 135–140° C., $\eta_{inh}=0.09$ in methanol, and consisting of the repeating unit

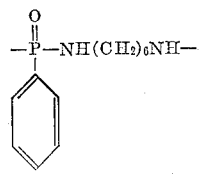

and analyzing as follows:

| Percent | Found | Calc'd. for $(C_{12}H_{19}N_2OP)_x$ |
|---|---|---|
| N | 10.55 | 11.76 |
| P | 12.67 | 13.00 |

The polymer was insoluble in water and soluble in methanol, benzyl alcohol and m-cresol.

*Example 2*

A mixture of 0.06 mole of diimidazol-1-ylphenyl-phosphine oxide and 6.25 g. (0.06 mole) of p-phenylenediamine was heated at 160° C. for 1.5 hours under a nitrogen stream. Introduction of nitrogen was then discontinued, vacuum (0.3 mm. Hg) was applied and heating was conducted at 190° C. for 2 hours under the vacuum. Methanol was added to the product and methanol-insoluble material was separated. Upon treating the residual methanol solution with ethanol, there precipitated out 2.6 g. of polymeric product, M.P. 245–255° C., and consisting essentially of the repeating unit:

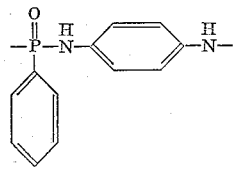

An additional 3.9 g. of polymer was obtained by precipitation of the residual liquor with ether. The overall yield of polymer thus obtained was 83%.

The polymer was insoluble in water, methanol, dimethylformamide, m-cresol, benzyl alcohol, and nitrobenzene and soluble in dimethyl sulfoxide, 98% formic acid and trifluoroacetic acid.

*Example 3*

A mixture consisting of 7.334 g. (0.0284 mole) diimidazol-1-ylphosphine oxide and 3.862 g. (0.0284 mole), of N,N'-dimethyl-p-phenylenediamine was heated at 135° C. for 11 hours under a nitrogen atmosphere, in a flask equipped with a condenser, that was cooled by Dry Ice. The reaction mixture was then allowed to cool and subsequently distilled under vacuum at 80–185° C. in order to remove the by-product imidazole. There was thus obtained 3.637 g. (0.0535 mole) of imidazole, a quantity short of theoretical. Accordingly the reaction mixture was heated at 240–258° C. for an additional 1.5 hours in order to complete the reaction, and again evacuated. An additional 0.287 g. of imidazole was obtained, making a total of 3.924 g., 0.0576 mole (theory, 0.0568 mole). There was thus obtained as residue the substantially pure polymeric phosphonic amide which consisted essentially of the repeating unit

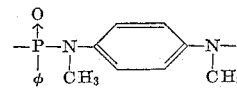

where $\phi$ denotes phenyl, and analyzing as follows:

| Percent | Found | Calc'd. for $C_{14}H_{15}N_2OP$ |
|---|---|---|
| C | 64.91 | 65.11 |
| H | 5.82 | 5.85 |
| N | 10.83 | 10.85 |
| P | 11.82 | 11.99 |

The polymer was a hard, brittle, solid which softened at 135°–145° C. It was insoluble in hot water and in hexane, and soluble in each of the following: methanol, ethanol, chloroform, pyridine, and 1-methyl-2-pyrollidinone.

Nuclear magnetic resonance analysis of the polymer, dissolved in alcohol, showed a $P^{31}$ chemical shift at −22.9 p.p.m., which is consistent with the phosphonic amide structure. Thermogravimetric analysis of the polymer in a helium atmosphere, at a temperature rise of 3° C. per minute, showed the polymer to be completely unaffected by heating it to about 280° C. Heating to 390° C. resulted in a weight loss of only about six percent.

*Example 4*

A mixture consisting of 0.047 mole of diimidazol-1-ylphenylphosphine oxide and 11.3 g. (0.057 mole) of 4,4'-methylene-dianiline was heated at 160° C. for 2 hours under a nitrogen stream. Introduction of nitrogen was then discontinued and the reaction mixture was heated for 1.5 hours at 190° C./0.3 mm. Addition of methanol to the resulting cooled reaction mixture gave a viscous, sticky substance. Leaching, first by ethanol and then with ether gave as residue 10.5 g. of the substantially pure polymeric product, a fine yellow powder softening at 185–190° C., decomposing in vacuum at 370–390° C., $\eta_{inh}$=0.07 in dimethylformamide, and consisting essentially of the repeating unit:

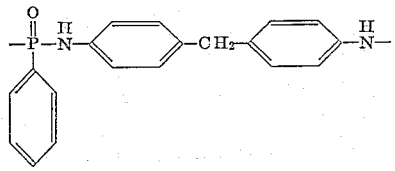

Another 1.5 g. of the polymer was recovered from the ethanol leachings by precipitation with water to give an overall polymer yield of 67%.

The polymer was insoluble in water, methanol and nitrobenzene, very slightly soluble in m-cresol, slightly soluble in benzyl alcohol and soluble in dimethylformamide and dimethyl sulfoxide.

Example 5

Benzidine (11.2 g., 0.061 mole) was heated with 0.061 mole of diimidazol-1-ylphenylphosphine oxide at 160° C. under a nitrogen stream for 1.5 hours and then under vacuum (0.3 mm.) at 190° C. for 1.5 hours. Addition of methanol and filtration gave the substantially pure polymer, softening at 210–215° C., decomposing in vacuum at about 330° C., and consisting essentially of the repeating unit:

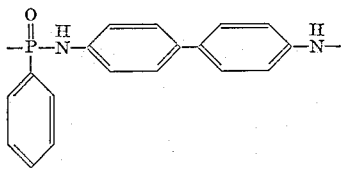

Addition of ethanol to the above-obtained methanol filtrate precipitated another 2.5 g. of the polymer, thus giving an overall yield of 77%.

The polymer was too insoluble to allow a viscosity determination. It was insoluble in water, 20% aqueous sodium hydroxide, methanol and nitrobenzene, very slightly soluble in benzyl alcohol, slightly soluble in dimethylformamide and dimethyl sulfoxide, and soluble with degradation in concentrated sulfuric acid.

Example 6

To a solution of 0.054 mole of diimidazol-1-ylphenylphosphine oxide in 300 ml. of tetrahydrofuran was added a solution of 4.65 g. (0.054 mole) of sublimed piperazine in 100 ml. of warm tetrahydrofuran. A white precipitate formed almost immediately. The solvent was distilled off and the residue was first heated with stirring under nitrogen for one hour at 65° C. and then under vacuum (0.25 mm.) at 230° C. for 3.5 hours. The resulting reaction mixture was dissolved in methanol, decolorized with charcoal, and evaporated. The residue thus obtained was dissolved in chloroform and reprecipitated first with boiling hexane, then with benzene and finally with hexane to give the substantially pure polymeric product, softening at 185–190° C., $\eta_{inh}$=0.083 in m-cresol, and consisting essentially of the repeating unit:

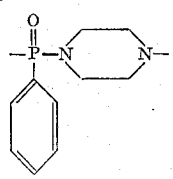

The polymer was very soluble in water and formamide, insoluble in methanol, dimethylformamide and dimethyl sulfoxide, soluble in m-cresol and benzyl alcohol.

Example 7

To a stirred solution of 17.0 g. (0.25 mole) of imidazole in 400 ml. of tetrahydrofuran there was added a solution of 12.2 g. (0.063 mole) of phenylphosphonic dichloride in 75 ml. of tetrahydrofuran, over a 15-minute period and under nitrogen. The reaction was then stirred at gentle reflux for 3 hours. After cooling to room temperature, the solid imidazole hydrochloride which had formed as by-product was filtered off under nitrogen by means of a filter stick, and the product was obtained in tetrahydrofuran solution. Removal of the tetrahydrofuran by distillation and vacuum drying of the residual white solid gave the substantially pure diimidazol-1-ylphenyl phosphine oxide, M.P. 98–100° C., giving by nuclear magnetic resonance analysis in dimethylformamide for $P^{31}$ a single peak at −6 p.p.m.

The above examples are given by way of illustration only, and the present invention is not to be considered as limited by them. It will be obvious to those skilled in the art that many modifications can be made within the spirit of the invention, which is limited only by the terms of the appended claims.

What we claim is:

1. The method which comprises heating a diimidazol-1-ylhydrocarbonphosphine oxide in which the hydrocarbon radical is benzenoid, contains from 6 to 12 carbon atoms and is free of olefinic and acetylenic unsaturation, with a substantially equimolar quantity of a nitrogeneous compound selected from the class consisting of (I) a diamine of the formula

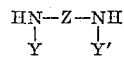

wherein Y and Y' are selected from the class consisting of hydrogen and hydrocarbyl radicals which are free of olefinic and acetylenic unsaturation and contain from 1 to 12 carbon atoms and Z is selected from the class consisting of hydrocarbylene radicals of from 3 to 15 carbon atoms and hydrocarbyleneoxyhydrocarbylene radicals of from 4 to 20 carbon atoms which are free of olefinic and acetylenic unsaturation and have the two nitrogen atoms attached to diverse, non-adjacent carbon atoms and (II) cyclic dialkylenediimines having from 1 to 3 carbon atoms in each alkylene chain and a total of from 4 to 12 carbon atoms in both alkylene radicals.

2. The method which comprises heating a diimidazol-1-ylhydrocarbonphosphine oxide with an alkylenediamine having the amino groups attached to non-adjacent carbon atoms and containing from 3 to 15 carbon atoms to obtain a polyphosphonamide consisting essentially of the repeating unit

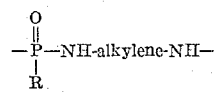

wherein the alkylene radicals has from 3 to 15 carbon atoms and R is a benzenoid hydrocarbon radical containing from 6 to 12 carbon atoms and being free of olefinic and acetylenic unsaturation.

3. The method which comprises heating a diimidazol-1-ylhydrocarbonphosphine oxide with an arylenediamine having the amino groups attached to non-adjacent carbon atoms of an arylene nucleus containing from 6 to 15 carbon atoms to obtain a polyphosphonamide consisting essentially of the repeating unit

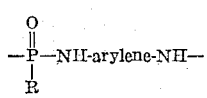

wherein the arylene radical has from 6 to 15 carbon atoms and R is a benzenoid hydrocarbon radical containing from 6 to 12 carbon atoms and being free of olefinic and acetylenic unsaturation.

4. The method which comprises heating a diimidazol-1-ylhydrocarbonphosphine oxide with a secondary arylenediamine having alkyl-substituted amino groups attached to non-adjacent carbon atoms of an arylene nucleus containing from 6 to 15 carbon atoms where the alkyl radicals have from 1 to 12 carbon atoms to obtain a polyphosphonamide consisting essentially of the repeating unit

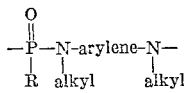

wherein the arylene radical has from 6 to 15 carbon atoms, the alkyl radicals have from 1 to 12 carbon atoms, and R is a benzenoid hydrocarbon radical containing from 6 to 12 carbon atoms and being free of olefinic and acetylenic unsaturation.

5. The method which comprises heating a diimidazol-1-ylhydrocarbonphosphine oxide with an aminohydrocarbyleneoxyhydrocarbyleneamine having the amino groups attached to non-adjacent carbon atoms and containing from 4 to 20 carbon atoms which are free of olefinic and acetylenic unsaturation to obtain a polyphosphonamide consisting essentially of the repeating unit

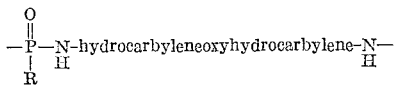

wherein the hydrocarbyleneoxyhydrocarbylene radical has from 4 to 20 carbon atoms, and R is a benzenoid hydrocarbon radical containing from 6 to 12 carbon atoms and being free of olefinic and acetylenic unsaturation.

6. The method which comprises heating diimidazol-1-ylphenylphosphine oxide with a cyclic dialkylenediimine having from 1 to 3 carbon atoms in each alkylene chain and a total of from 4 to 12 carbon atoms in both alkylene radicals to obtain a polyphosphonamide consisting essentially of the repeating unit.

where D and D' are alkylene radicals having from 1 to 3 carbon atoms in the chain and a total of from 4 to 12 carbon atoms in both alkylene radicals, and R is a benzoid hydrocarbon radical containing from 6 to 12 carbon atoms and being free from olefinic and acetylenic unsaturation.

7. The method which comprises heating diimidazol-1-ylphenylphosphine oxide with 1,6-hexanediamine to obtain a polyphosphonamide consisting essentially of the repeating unit

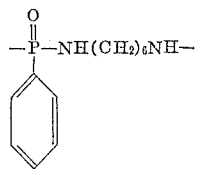

8. The method which comprises heating diimidazol-1-ylphenylphosphine oxide with p-phenylenediamine to obtain a polyphosphonamide consisting essentially of the repeating unit

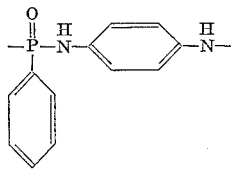

9. The method which comprises heating diimidazol-1-ylphenylphosphine oxide with N,N'-dimethyl-p-phenylenediamine to obtain a polyphosphonamide consisting essentially of the repeating unit

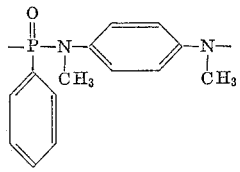

10. The method which comprises heating diimidazol-1-ylphenylphosphine oxide with 4,4'-methylenedianiline to obtain a polyphosphonamide consisting essentially of the repeating unit

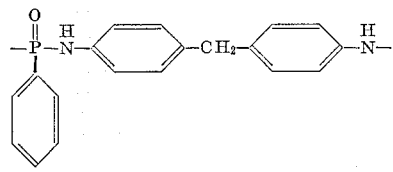

11. The method which comprises heating diimidazol-1-ylphenylphosphine oxide with benzidine to obtain a polyphosphonamide consisting essentially of the repeating unit

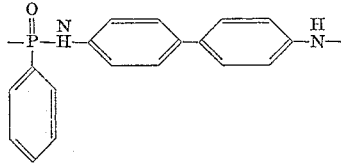

12. The method which comprises heating diimidazol-1-phenylphosphine oxide with piperazine to obtain a polyphosphonamide consisting essentially of the repeating unit

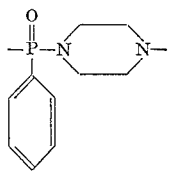

References Cited by the Examiner
UNITED STATES PATENTS
3,116,268  12/1963  Farago _____ 260—2

SAMUEL H. BLECH, *Primary Examiner.*

UNITED STATES PATENT OFFICE
CERTIFICATE OF CORRECTION

Patent No. 3,244,647                        April 5, 1966

Robert Z. Greenley et al.

It is hereby certified that error appears in the above numbered patent requiring correction and that the said Letters Patent should read as corrected below.

Column 3, line 57, for "axybis(arylenediamines)" read -- oxybis(arylenediamines) --; column 5, line 42, for "(0.625 mole)" read -- (0.0625 mole) --; column 7, line 21, for "dimethy" read -- dimethyl --; column 8, line 57, for "radicals" read -- radical --; column 10, lines 39 to 44, the formula should appear as shown below instead of as in the patent:

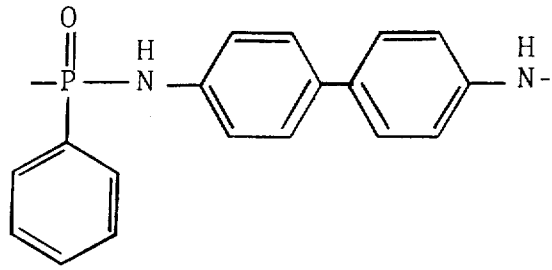

Signed and sealed this 9th day of January 1968.

(SEAL)
Attest:

EDWARD M. FLETCHER, JR.                      EDWARD J. BRENNER
Attesting Officer                              Commissioner of Patents